(12) United States Patent
Okuda et al.

(10) Patent No.: US 7,924,325 B2
(45) Date of Patent: Apr. 12, 2011

(54) IMAGING DEVICE AND IMAGING SYSTEM

(75) Inventors: Nobukatsu Okuda, Osaka (JP); Hideki Otaka, Osaka (JP); Katsuyuki Sakaniwa, Hyogo (JP); Hiroshi Saitoh, Osaka (JP); Toshihiro Tanaka, Hyogo (JP); Hisataka Ueda, Osaka (JP); Norikatsu Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 1221 days.

(21) Appl. No.: 11/547,634

(22) PCT Filed: Apr. 14, 2005

(86) PCT No.: PCT/JP2005/007259
§ 371 (c)(1),
(2), (4) Date: Oct. 5, 2006

(87) PCT Pub. No.: WO2005/101825
PCT Pub. Date: Oct. 27, 2005

(65) Prior Publication Data
US 2008/0106614 A1   May 8, 2008

(30) Foreign Application Priority Data

Apr. 16, 2004 (JP) .............................. 2004-121708
Aug. 24, 2004 (JP) .............................. 2004-243856

(51) Int. Cl.
*H04N 5/225* (2006.01)
(52) U.S. Cl. ................................................. 348/231.4
(58) Field of Classification Search .............. 348/14.01, 348/14.02, 14.04, 207.99, 207.1, 231.2–231.4; 386/52, 54, 55, 252, 254, 255
See application file for complete search history.

(56) References Cited

U.S. PATENT DOCUMENTS

| 7,528,867 | B2 * | 5/2009 | Ishiyama et al. ........... 348/231.3 |
| 2003/0133022 | A1 | 7/2003 | Melton |
| 2004/0095474 | A1 * | 5/2004 | Matsufune ................. 348/220.1 |
| 2004/0267819 | A1 * | 12/2004 | Shinkai et al. ............. 707/104.1 |

FOREIGN PATENT DOCUMENTS

EP    1 102 271 A1    5/2001
(Continued)

OTHER PUBLICATIONS

European Search Report, filed in corresponding European Patent Application No. 05730608.6-2202, mailed on Dec. 12, 2007.

*Primary Examiner* — Tuan Ho
(74) *Attorney, Agent, or Firm* — McDermott Will & Emery LLP

(57) ABSTRACT

In recording materials of a video program or the like, the video materials are efficiently and optimally acquired so that processing steps in and after an editing step subsequent to a recording step can be reduced. A recording support information (metadata) on a schedule of and a performer for an imaging operation, and the like, which are determined in advance is recorded in a first recording medium 16 by a program constitution input device 100. The first recording medium 16 is inserted in to an imaging device 200, materials to be recorded are classified and confirmed based on the metadata, and the materials which can constitute a desirable program as potentially as possible are acquired in the recording operation.

18 Claims, 15 Drawing Sheets

FOREIGN PATENT DOCUMENTS

| | | |
|---|---|---|
| EP | 1 187 472 A1 | 3/2002 |
| JP | 09-034912 | 2/1997 |
| JP | 10-174053 A | 6/1998 |
| JP | 2000-92419 A | 3/2000 |
| JP | 2001-077777 | 3/2001 |
| JP | 2001-292410 A | 10/2001 |
| JP | 2002-077861 | 3/2002 |
| JP | 2003-78868 A | 3/2003 |

* cited by examiner

FIG.5 recorded performer information (schedule)

| | performer in each scene | | | |
|---|---|---|---|---|
| scene 48 | A | B | C | |
| scene 10 | A | B | D | F | G |
| scene 29 | ● | ● | ● | ● | ● |
| ..... | | | | |
| scene 3 | H | J | K | L |

FIG.6 recording site information (schedule)

| | recording site of each scene |
|---|---|
| scene 48 | site (1) |
| scene 10 | site (2) |
| scene 29 | site (3) |
| ..... | ..... |
| scene 3 | site (50) |

FIG.7

| clip ID | recording date information (imaging) | recorded performer information (imaging) | recording site information (imaging) |
|---------|---------------------------------------|------------------------------------------|--------------------------------------|
| clip 1  | T1  | A. B. C       | site (1)  |
| clip 2  | T2  | A. B. C       | site (1)  |
| clip 3  | T3  | A. B. C       | site (1)  |
| clip 4  | T4  | A. B. D. F. G | site (2)  |
| clip 5  | T5  | A. B. D. F. G | site (2)  |
| clip 6  | T6  | A. B. D. F. G | site (2)  |
| clip 7  | T7  | A. B. D. F. G | site (2)  |
| ...     | ... | ...           | ...       |
| clip 199| T199| H. J. K. L    | site (50) |
| clip 200| T200| H. J. K. L    | site (50) |

FIG.11

| editing list | | |
|---|---|---|
| scene ID | clip ID | OK/NG |
| ... | ... | ... |
| scene 3 | clip 199 | NG |
| | clip 200 | OK |
| ... | ... | ... |
| scene 10 | clip 4 | NG |
| | clip 5 | NG |
| | clip 6 | OK |
| | clip 7 | NG |
| ... | ... | ... |
| scene 29 | clip 8 | NG |
| | clip 9 | NG |
| | clip 10 | OK |
| | clip 11 | NG |
| | clip 12 | NG |
| ... | ... | ... |
| scene 48 | clip 1 | NG |
| | clip 2 | NG |
| | clip 3 | OK |
| ... | ... | ... |

IMAGING DEVICE AND IMAGING SYSTEM

RELATED APPLICATIONS

This application is the U.S. National Phase under 35 U.S.C. §371 of International Application No. PCT/JP2005/007259, filed on Apr. 14, 2005, which in turn claims the benefit of Japanese Application No. 2004-121708, filed on Apr. 16, 2004, Japanese Application No. 2004-243856, filed on Aug. 24, 2004 the disclosures of which Applications are incorporated by reference herein.

FIELD OF THE INVENTION

The present invention relates to an imaging device and an imaging system for recording a video/audio information based on a recording support information previously recorded in a recording medium or the like and inputted to the imaging device.

BACKGROUND TECHNOLOGY

A video program supplied through a television broadcast or package media of various types is produced in successive processing steps (workflow) such as planning of the video program, recording of a video/audio information (materials) necessary for constituting the video program, and editorial processing to construct a final video program by editing the recorded materials. The planning step is a step for planning and drafting what kind of video program should be produced, in which a program constitution and a program information are determined. The recording step is a step for recording the necessary materials to various recording media using an imaging device (for example, camera-incorporated VTR) based on the program constitution determined in the planning step. In the editing step, the necessary materials selected from the recorded materials are combined so that the final video program is formed.

In these steps, not only video and audio signals, but also various information about the video program and materials (hereinafter, referred to as metadata) are produced in the planning step. More specifically, the metadata (planning) such as information necessary for the constitution of the video program and the materials (performer, recording conditions and the like) are generated in the planning step.

In the step for recording the materials, the materials are recorded based on the metadata (planning) thus generated. In the step for recording the materials, additional information relating to the materials (an imaging time, an imaging place and an operator of the imaging device and the like) are automatically or manually produced and registered at a time point when the materials are obtained (a location where the materials are recorded). The additional information relating to the materials are stored in the recording medium in association with the materials.

The editing step comprises two steps, which are an off-line editing (rough editing) step for determining which part of the materials is used to constitute the video program and an on-line editing step for actually editing the materials based on an editing metadata such as an editing information (EDL: Edit Decision List) generated in the off-line editing step. The final video program is completed by the on-line editing step, and the various metadata generated during the production steps are somehow associated with the video program and the respective materials constituting the video program, and then registered and stored in database.

There is conventionally the following construction in a system as described above, wherein the materials such as the video and audio are recorded, edited and processed them to produce the video program and the completed video program is stored in relation to the foregoing metadata generated in the recording step in the program production steps and methods for generating and recording the metadata. In the following description, terms such as planning and research, which are originally used in the following description of the conventional constitution, are replaced with terms such as planning and recording used in the description of the present invention so as to unify the terms as used in the present invention.

First, the metadata for explaining the materials in detail is generated and inputted to the recording medium in the step for recording the materials. There are two kinds of metadata to be added to the materials in the recording step. A first data is a metadata previously determined in the planning step, such as starting time, finishing time and imaging site (geographical name), imaging person. The metadata is wirelessly transmitted to the imaging device. The imaging device temporarily memorizes the received metadata in a memory, reads the metadata from the memory when the materials are actually recorded, and records the recorded materials and the read metadata to the recording medium in association with each other.

A second data is metadata generated synchronously with the imaging operation and recorded in the recording medium. The second data includes a positional information (latitude, longitude and altitude) detected by the GPS (Global Positioning System), time information, geographical name of a recording site, information of an imaging equipment (equipment ID), camera setup information such as a lens information, UMID (Unique Material Identifier) for discriminating the materials, and the like.

The metadata recorded in the recording medium together with the materials in the recording step is utilized in the subsequent steps and stored in an archive in association with the materials. Thus, the conventional imaging device efficiently generates the metadata relating to the materials and records the metadata together with the materials in the recording medium. The metadata that can be set in the planning step (the first data described above) is previously inputted to the imaging device prior to the recording operation. The metadata that can be obtained only after the materials are acquired (the second data described above) is recorded synchronously with the material in the recording operation, so that the materials and the metadata relating to the materials are recorded in the recording medium when the recording operation is completed. The metadata for the materials is used as a metadata for, for example, searching the materials in the subsequent steps or in the archive.

See the Patent Literatures 1 and 2

Patent Literature 1: No. 2001-292410 of the Publication of the Unexamined Japanese Patent Applications Patent Literature 2: No. 2000-92419 of the Publication of the Unexamined Japanese Patent Applications

DISCLOSURE OF THE INVENTION

Problems to be Solved by the Invention

In the program production, the recorded materials are edited and processed in the subsequent steps so as to complete the final video program. Therefore, it is necessary to obtain the materials in the recoding step in consideration of the constitution of the final video program and the various processes. In the conventional imaging system (Patent Literature 1) mentioned above, the plural cuts of the necessary materials are simply recorded and the metadata is recorded at the same time. Therefore, it is not possible to efficiently and optimally obtain the materials utilizing the information supporting the recording operation in the conventional imaging system. For example, it has been difficult to record the materials in the recording stage in consideration of how the materials (scenes) currently being recorded should be joined with different scenes in the final video program and what kind of processing should be executed thereto.

Therefore, the plural cuts of the necessary scenes are simply recorded in the recording step, the plural materials recorded in the recording step are organized and managed in the subsequent editing step, the optimal materials for constituting the video program are selected, and the respective scenes are put together and processed, so that the program can be finally produced. Accordingly, a large amount of time was consequently demanded in the editing and other steps subsequent to the recording step in the program production in which the conventional imaging system was used.

The conventional imaging system (Patent Literature 2) discloses a constitution wherein an information indicating which scenes of the video program the recorded materials correspond to is appended to the recorded materials. However, in the constitution, the information showing the correspondence has to be manually inputted to the imaging device by the person involved in the imaging operation, which inevitably complicates the process.

Means for Solving the Problems

In order to solve the foregoing problems, an imaging device according to the present invention comprises an imaging unit for recording a video/audio information, an input unit to which a recording support information of the video/audio information is inputted, and a managing unit for classifying the video/audio information based on the recording support information, wherein the input unit keeps the recording support information inputted to the input unit, and then records the video/audio information by the imaging unit, and the managing unit collates a status information at an imaging indicating a status of the video/audio information in an imaging operation obtained when the video/audio information is imaged with the recording support information to thereby classify the recorded video/audio information.

In the foregoing constitution, the recording support information is an information relating to a constitution of a video program produced based on the video/audio information as materials. It is preferable that the managing unit classifies the video/audio information based on the information relating to the constitution of the video program. Thereby, the video/audio information generated when the video program is produced can be automatically and accurately classified.

Further, it is preferable in the foregoing constitution that a plurality of scenes constitute the video program, the recording support information be set for each scene, and the managing unit classify each video/audio information per scene based on the information relating to the constitution of the video program. Accordingly, the video/audio information generated can be automatically and accurately classified per scene.

More specifically, a construction of the imaging device can further be comprised as follows, namely, an acquiring unit to acquire the imaging status information when the video/audio information is imaged by the imaging unit, wherein the managing unit collates the recording support information with the imaging status information to thereby classify the video/audio information.

Further, the recording support information is an information relating to a time schedule for recording the video/audio information, and the video/audio information can be classified based on the date and time of the imaging operation if the imaging status information is an information relating to a date and time when the video/audio information was actually recorded.

In the case that the recording support information is an information relating to a scheduled site for recording the video/audio information, and the imaging status information is an information relating to a site where the video/audio information was actually recorded, the video/audio information can be classified based on the imaging operation site.

In the case that the recording support information is an information relating to a performer scheduled to appear in the video program produced based on the video/audio information as the materials, and the imaging status information is an information relating to a performer who actually appeared in the video/audio information, the video/audio information can be classified based on the performer of the imaging operation.

In the case that the imaging device further comprises an index information generator for generating an index information for collectively managing the video/audio information based on a classification result by the managing unit and a recorder for recording the video/audio information and the index information in a freely attachable or removable recording medium, the classification result can be recorded in the recording medium in association with the video/audio information.

The recording support information, for example, can be inputted to the imaging device in a state where it is written in the recording medium. Thereby, the recording medium in which the recording support information is written can be used as a recording medium in the recorder without being distinguished from any other recording medium.

It is preferable that the imaging device further comprises an evaluation input unit for receiving an input relating to a recording status evaluation for the video/audio information made by an imaging operator, wherein the managing unit further classifies the recorded video/audio information based on the recording status evaluation inputted to the evaluation input unit. Thereby, the video/audio information can be classified in more detail based on the recording status evaluation.

When the evaluation input unit receives a voice input from the operator of the imaging operation and converts the voice input into the recording status evaluation consisting of a text data through audio recognition, the recording status can be evaluated based on the voice of the imaging manager (director of the imaging operation), which facilitates the input of the recording status evaluation.

It is preferable that the imaging device further comprises a classification table for the recoding status evaluation, wherein the managing unit collates the text data of the recording status evaluation supplied from the evaluation input unit with the classification table to thereby further classify the recorded video/audio information. Thereby, the video/audio information can be classified in more detail based on the plural recording status evaluations.

In implementing the constitution according to the present invention, it is preferable that an imaging system further comprises a program constitution input device for receiving the input of the recording support information by the operator and recording the inputted recording support information in the recording medium in addition to the imaging device according to the present invention.

The video/audio information according to the present invention includes at least one of the video information and the audio information.

Effect of the Invention

According to the present invention, the materials are efficiently and optimally recorded through use of the metadata when the materials are recorded in a workflow of the program production, so that it is possible to achieve an improved efficiency of the whole steps for producing the program, and shorten a production time and reduce a production cost.

BRIEF DESCRIPTION OF THE DRAWINGS

FIG. 5 is a schematic diagram of a performer information for recording (plan) according to the present invention.

FIG. 6 is a schematic diagram of a site information for recording (plan) according to the present invention.

FIG. 7 shows a correlation between recorded clips and imaging status information appended to the recorded clips according to the present invention.

FIG. 11 shows an example of an editing list.

Figure 1:
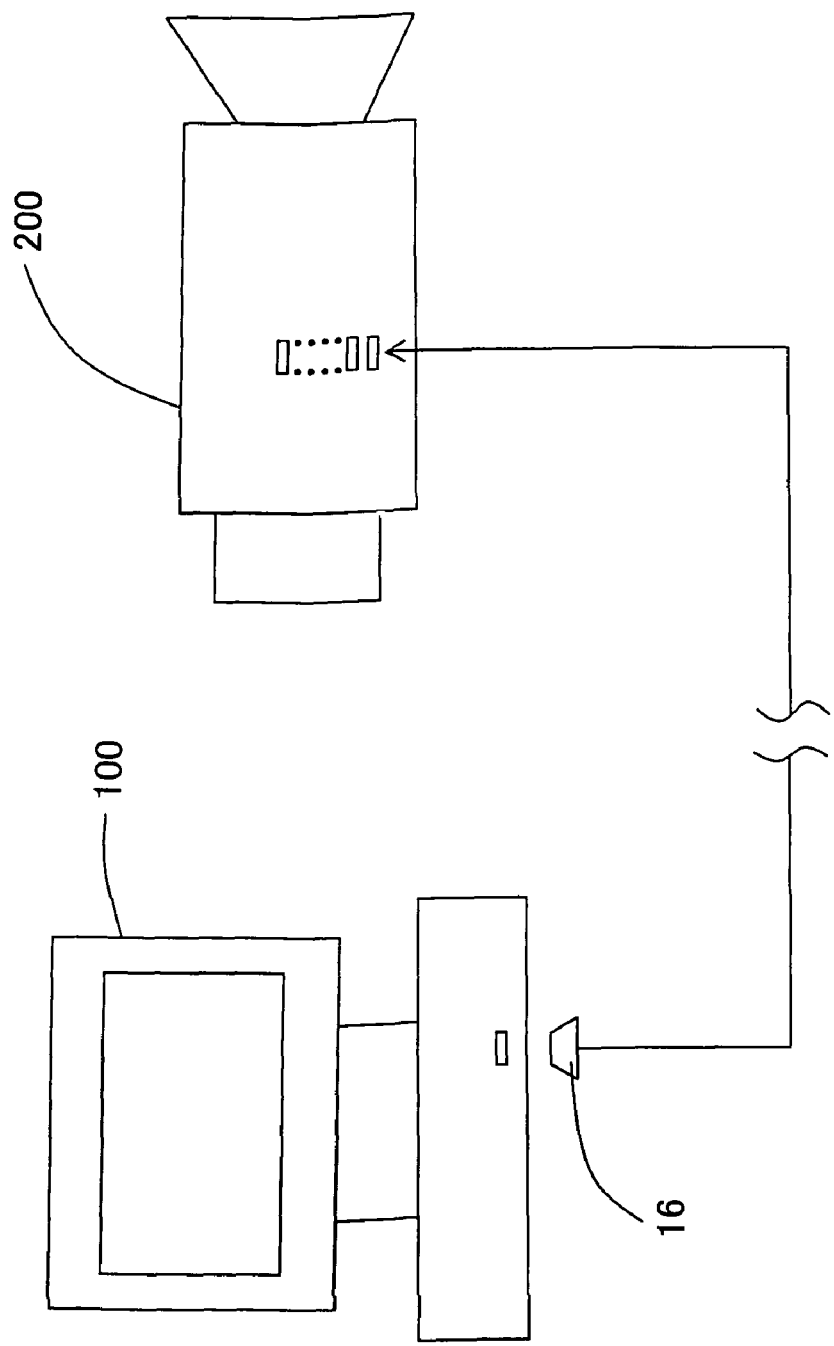
FIG. 1 shows a constitution diagram of an imaging system according to a preferred embodiment 1 of the present invention.

DESCRIPTION OF REFERENCE SYMBOLS 1 imaging unit
2 recorded video signal processor
3 video signal encoder
4 microphone
5 recorded audio signal processor
6 audio signal encoder
7A first information acquiring unit
7B second information acquiring unit
7a time schedule information acquiring section
7b performer information acquiring section
7c site information acquiring section
7d radio transmitter
7e radio receiver
7f GPS position detector
9 file-managing unit
10 video file generator
11 audio file generator
12 index file generator
13 recording/reproduction controller
14 first loader
15 nth loader
16 first recording medium
17 nth recording medium
18 video file reproducer
19 video signal compositor
20 viewfinder
30 incorporated timer
31 audio recognizer
32 classification table
33 classification table
100 program constitution input device
200 imaging device
200' imaging device
α performer appearing in imaging operation

DETAILED DESCRIPTION OF PREFERRED EMBODIMENTS

Hereinafter, preferred embodiments of the present invention are described referring to FIGS. 1 to 15. In imaging devices according to the respective embodiments, an video/audio information is recorded in the form of a file, and a video data and an audio data are recorded as different files in consideration of date affinity with editing device. As a result, a plurality of files are simultaneously generated in an imaging operation. The video and audio files thus simultaneously generated are collectively called clips. A thumbnail (sample of reduced image) and other metadata, other than the image and audio, may be associated with these clips. The video and audio files constituting the clips are called essence files. The video/audio information used in the imaging device according to the present invention includes at least one of the video information and the audio information. The video/audio information generally includes both of the video information and the audio information, however, the information including only the video information is handled as one of the video/audio information in the present invention.

Preferred Embodiment 1

Figure 2:
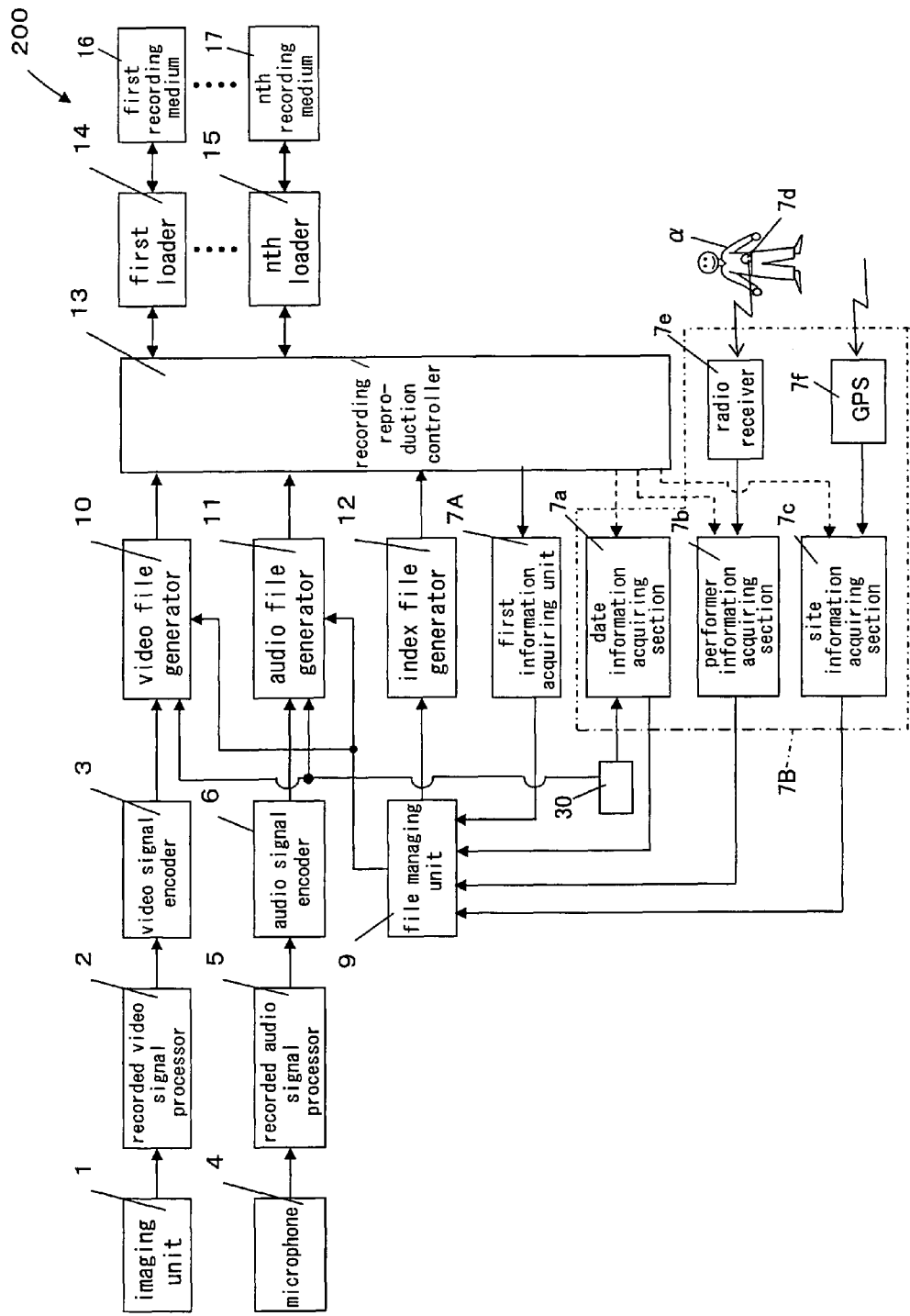
FIG. 2 is a block diagram of an imaging device according to the preferred embodiment 1.

FIG. 1 shows a constitution diagram of an imaging system according to a preferred embodiment 1 of the present invention. FIG. 2 is a block diagram of an imaging device 200 constituting the imaging system. The imaging system comprises a program constitution input device 100 and the imaging device 200.

The program constitution input device 100 is an input device to which a drafted plan of a video program is inputted, for example, which is consisted of a personal computer in which a software for supporting the planning of the video program is installed.

The imaging device 200 comprises an image pickup unit 1, a recorded video signal processor 2, a video signal encoder 3, a microphone 4 as a sound/voice collector, a recorded audio signal processor 5, an audio signal encoder 6, a first information acquiring unit 7A, a second information acquiring unit 7B, a file-managing unit 9, a video file generator 10, an audio file generator 11, an index file generator 12, a recording/reproduction controller 13, a first loader 14, an nth loader 15, a first recording medium 16 and an nth recording medium 17.

The image pickup unit 1, recorded video signal processor 2, video signal encoder 3, microphone 4, recorded audio signal processor 5, audio signal encoder 6, video file generator 10 and audio file generator 11 constitute an example of an imaging unit. However, it is needless to say that the foregoing constitution is merely an example of the imaging unit, and a general different constitution could be also acceptable.

The recording/reproduction controller 13 and the first-nth loaders 14 and 15 constitute a recorder. However, it is needless to say that the foregoing constitution is merely an example of the recorder, and a general different constitution could be also acceptable.

The first information acquiring unit 7A reads a program constitution information, that is stored in the first recording medium 16 and fetched into the imaging device 200, from the first recording medium 16 via the first loader 14 and the recording/reproduction controller 13 and outputs the read information to the file-managing unit 9. The program constitution information is one of recording support information and is a data that is generated in the program constitution input device 100 and recorded in the first recording medium 16. Detail of the program constitution information will be described later.

Further, the first information acquiring unit 7A reads a recording date and time information, that stored in the first recording medium 16 and fetched into the imaging device 200, from the first recording medium 16 via the first loader 14 and the recording/reproduction controller 13 and outputs the read information to the file-managing unit 9. The recording date information is one of the recording support information and is a data generated in the program constitution input device 100 and recorded in the first recording medium 16, which will be hereinafter called a recording date information (schedule). Detail of the recording date information will be described later.

Further, the first information acquiring unit 7A reads a recorded performer information, that stored in the first recording medium 16 and fetched into the imaging device 200, from the first recording medium 16 via the first loader 14 and the recording/reproduction controller 13 and outputs the read information to the file-managing unit 9. The recorded performer information is one of the recording support information and is a data that is generated in the program constitution input device 100 and recorded in the first recording medium 16, which will be hereinafter called a recorded performer information (schedule).

Further, the first information acquiring unit 7A reads a recording site information, that is stored in the first recording medium 16 and fetched into the imaging device 200, from the first recording medium 16 via the first loader 14 and the recording/reproduction controller 13 and outputs the read information to the file-managing unit 9. The recording site information is one of the recording support information and is a data that is generated in the program constitution input device 100 and recorded in the first recording medium 16, which will be hereinafter called a recording site information (schedule). Detail of the recording site information will be described later.

The second information acquiring unit 7B comprises a date information acquiring section 7a, a performer information acquiring section 7b and a site information acquiring section 7c.

The date information acquiring section 7a generates date and time information when the imaging operation is implemented and outputs the generated information to the file-managing unit 9. The recording date information at the time of the imaging operation is one of imaging status information and will be hereinafter called the recording date information (filming).

The performer information acquiring section 7b acquires information on a performer appearing in the imaging operation when the imaging operation is implemented and outputs the acquired information in the file-managing unit 9. The recorded performer information at the time of the imaging operation is one of the imaging status information. The information on the performer actually appearing in the imaging operation will be hereinafter called the recorded performer information (filming). The recorded performer information (filming) is generated and managed by the performer information acquiring section 7b, for example, as follows. As shown in FIG. 2, a radio transmitter 7d is already worn by a performer a appearing in the imaging operation. Performer-identifying information (performer ID number) is previously registered in the radio transmitter 7d, and a radio signal additionally including the performer identifying information (performer ID number) is transmitted to the imaging device 200 in the imaging operation. The performer information acquiring section 7b is provided with a radio receiver 7e. When the radio receiver 7e receives the radio signal in the imaging operation, the performer information acquiring section 7b extracts the performer identifying information (performer ID number) from the received radio signal to thereby generate the recorded performer information (filming) and output the generated recorded performer information (filming) to the file-managing unit 9.

The site information acquiring section 7c acquires information on a site where the video imaging operation is implemented and outputs the acquired site information to the file-managing unit 9. The site information is one of the imaging status information in the imaging operation. The information on the actual recording site in the imaging operation will be hereinafter called a recording site information (filming). The recording site information (filming) is managed by the site information acquiring section 7c, for example, as follows. The site information acquiring section 7c comprises a GPS positioning apparatus 7f for measuring a current location based on GPS (Global Positioning System). The site information acquiring section 7c the current location when the imaging operation is implemented (site where the imaging operation is implemented) using the GPS positioning apparatus 7f to thereby generate the recording site information (filming) and output the generated information to the file-managing unit 9.

In the present preferred embodiment, the first information acquiring unit 7A, recording/reproduction controller 13 and first loader 14 constitute an example of an input unit, the second information acquiring unit 7B constitutes an example of an imaging status acquiring unit, and the file-managing unit 9 constitutes an example of a managing unit.

Figure 3:
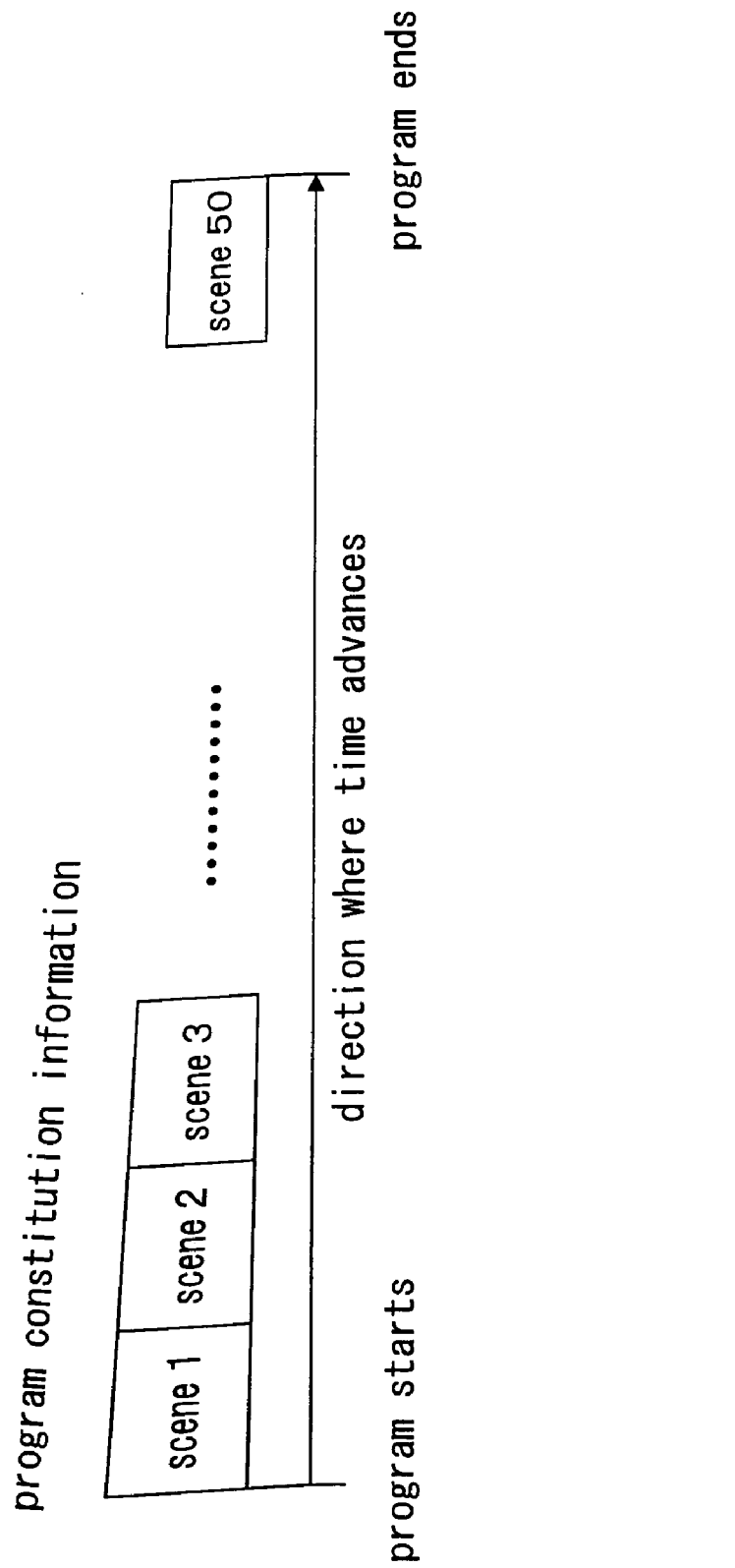
FIG. 3 is a schematic diagram of a program constitution information according to the present invention.

FIG. 3 is a schematic diagram of the program constitution information inputted to the program constitution input device 100 by a planner of the video program. As shown in FIG. 3, a plurality of scenes constitute one video program, and the one program can be completed at last when the plurality of scenes are joined with each other in order according to a scenario. It is known from the drawing that 50 scenes from a scene 1 through a scene 50 constitute the one video program. The planner of the video program first conceives such a program constitution based on the scenario or the like and inputs the conceived program constitution to the program constitution input device 100. The program constitution information thus inputted to the program constitution input device 100 is recorded in a recorder of the program constitution input device 100 not shown.

Figure 4:
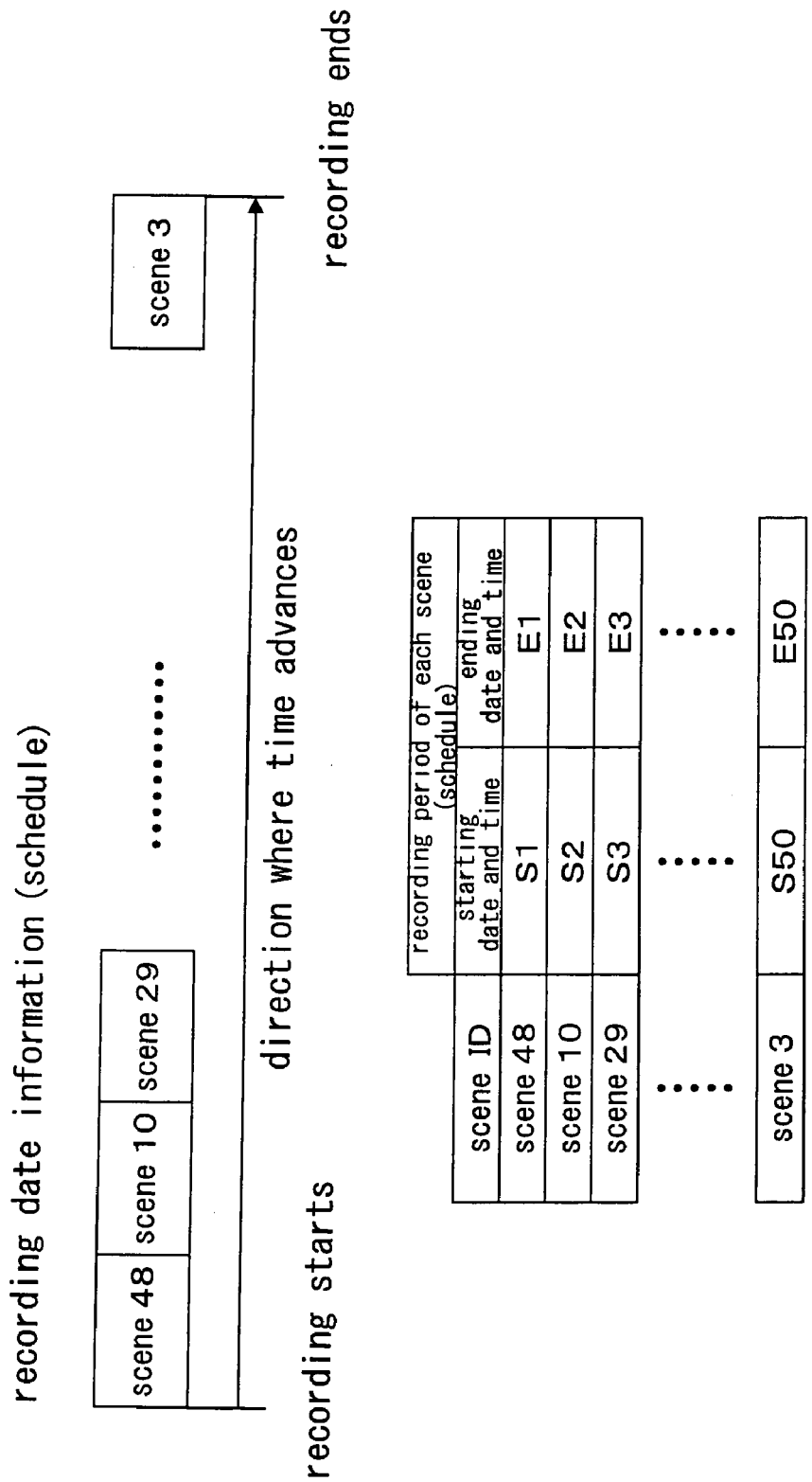
FIG. 4 is a schematic diagram of a time schedule information for recording (plan) according to the present invention.

FIG. 4 is a schematic diagram of the recording date information (schedule) inputted to the program constitution input device 100 by the planner of the video program. As shown in FIG. 4, the respective scenes are generally recorded in an order different from that of the program constitution. The recording operation starts with any scene that is ready to be recorded depending on such various factors as schedule of the performer (actor), weather condition, and reservation statuses of the location site and studio, and the recording schedule, which is possibly changed during the operation, is generally known before the recording starts. The planner of the video program conceives recording date information (schedule) based on the previously known recording schedule, and inputs the conceived recording date information (schedule) to the program constitution input device 100. The recording date information (schedule) inputted to the program constitution input device 100 is recorded in the recorder of the program constitution input device 100 not shown.

In FIG. 4, the scene 48 is first recorded, followed by the scene 10. The scene 29 is thereafter recorded, and then, the scene 3 is finally recorded. As shown in a table of the drawing, a recording period of each scene is set in the each scene. For example, a recording of the scene 48 is scheduled between a starting date and time S1 and an ending date and time E1, and some of the desired clips constituting the scene 48 are made schedule to be recorded during the recording period for the scenes. Similarly, the recording of the scene 10, the scene 29, and the scene 3 are scheduled respectively between a starting date and time S2 and an ending date and time E2, between a starting date and time S3 and an ending date and time E3, and between a starting date and time S50 and an ending date and time E50. Some of the desired clips constituting the respective scenes are made schedule to be recorded per scene during the recording periods for the respective scenes.

FIG. 5 is a schematic diagram of the recorded performer information (schedule) inputted to the program constitution input device 100 by the planner of the video program. As shown in FIG. 5, the performer appearing in each scene (actor or the like) is known before the recording starts (when the scenario is finalized). The planner inputs the recorded performer information (schedule) to the program constitution input device 100 based on the previously known recording schedule. The recorded performer information (schedule) inputted to the program constitution input device 100 is recorded in the recorder of the program constitution input device 100 not shown.

In FIG. 5, performers A, B and C appear in the scene 48 first recorded, and performers A, B, D, F and G appear in the scene 10 subsequently recorded. Other relevant performers are recorded in the other scenes in a similar manner. The performers are displayed and managed by their names as shown in FIG. 5 on a display screen of the program constitution input device 100. However, the scheduled performers, each of whom is given a specific performer ID number in advance, are registered and managed inside the program constitution input device 100 based on their performer ID numbers.

FIG. 6 is a schematic diagram of the recording site information (schedule) inputted to the program constitution input device 100 by the planner of the video program. As shown in FIG. 6, the site where each scene is imaged is known before the recording starts (when the recording schedule is finalized). The planner inputs the recording site information (schedule) to the program constitution input device 100 based on the previously known recording schedule. The recording site information (schedule) inputted to the program constitution input device 100 is recorded in the recorder of the program constitution input device 100 not shown. The recording sites are displayed and managed by their site names as shown in FIG. 6 on the display screen of the program constitution input device 100, however, they are registered based on numeral data respectively showing latitude, longitude and altitude inside the program constitution input device 100.

In FIG. 6, a site (1) is registered as the recording site of the scene 48 first recorded, and a site (2) is registered as the recording site of the scene 10 subsequently recorded. Regarding the other scenes, the relevant recording sites are recorded in a similar manner.

The recording support information according to the present preferred embodiment comprise the program constitution information shown in FIG. 3, the recording date information (schedule) shown in FIG. 4, the recorded performer information (schedule) shown in FIG. 5, and the recording site information shown in FIG. 6 (schedule). The imaging status information according to the present preferred embodiment comprise the recording date information (filming), the recorded performer information (filming) and the recording site information (filming).

A recorder/reproducer (not shown) of the first recoding medium 16 is incorporated in the program constitution input device 100, and the recording support information inputted to the program constitution input device 100 by the planner of the video program are recorded in the first recoding medium 16 by the program constitution input device 100. The first recording medium 16 in which the recording support information is recorded is removed from the program constitution input device 100 by a person in charge of the imaging operation for the video program and loaded in the first loader 14 of the imaging device 200.

When the first recording medium 16 is loaded in the first loader 14, the recording/reproduction controller 13 reads the recording support information from the first recording medium 16, and the first information acquiring unit 7A extracts the program constitution information, recording date information (schedule), recorded performer information (schedule) and recording site information (schedule) from the read recording support information. These extracted information are inputted to the file-managing unit 9. The file-managing unit 9 records the information, and classifies the clips for each of the scenes constituting the video program and uses a result of the classification as classification reference information for collective management.

A constitution to transmit the recording support information is not limited to transmission from the program constitution input device 100 to the imaging device 200 via the first recording medium 16. As a different form of the transmission, the recording support information may be transmitted, for example, from the program constitution input device 100 to the imaging device 200 after the program constitution input device 100 and the imaging device 200 are by wire or wirelessly connected to each other to allow an intercommunication.

Further, the recording support information may be transmitted from the program constitution input device 100 to the imaging device 200, and then recorded in the recording medium of the imaging device 200 to be used, or may be transmitted from the program constitution input device 100 to the imaging device 200 whenever the recording support information are necessary (for example, retrieved via a wired or wireless network).

When the recording operation starts after the preparations for the recoding described so far are completed, an optical signal is converted into an electrical signal by an imaging element in the image pickup unit 1, and then inputted to the recorded video signal processor 2. The electrical signal is subjected to signal processing such as a gamma processing and a knee processing in the recorded video signal processor 2 and outputted as a digital video signal. The digital video signal of the original image outputted from the recorded video signal processor 2 is inputted to the video signal encoder 3 to be encoded therein according to a predetermined system, and then outputted as a video-encoded bit stream.

The video-encoded bit stream outputted from the video signal encoder 3 is generated as a video file according to a predetermined file format by the video file generator 10 together with a file management information managed by the file-managing unit 9.

A sound is converted into an electrical signal in the microphone 4, and the audio signal outputted from the microphone 4 is inputted to the recorded audio processor 5. The recorded audio signal processor 5 amplifies the audio signal outputted from the microphone 4 using an amplifier. The audio signal outputted from the amplifier is inputted to an A/D converter to be converted into a digital signal therein. The digital audio signal outputted from the recorded audio signal processor 5 is inputted to the audio signal encoder 6 and encoded therein according to a system such as MPEG audio or AC-3. The encoded audio signal is outputted from the audio signal encoder 6 as an audio-encoded bit stream.

The audio-encoded bit stream outputted from the audio signal encoder 6 is generated as an audio file according to a predetermined file format by the audio file generator 11 together with the file management information managed by the file-managing unit 9.

Further, an index file for collectively managing the necessary information per clip is generated by the index file generator 12 according to a predetermined file format by the index file generator 12 based on the file management information managed by the file-managing unit 9 so that the video files and audio files necessary for constituting one clip can be indexed.

The data of the video, audio and index files respectively generated by the file generators 10, 11 and 12 are inputted to the recording/reproduction controller 13 so as to control the recording of the data of the respective files. The data of the video, audio and index files inputted to the recording/reproduction controller 13 is interleaved with an integral multiple of a cluster unit which is based on an ECC block unit, an erasing unit or the like of the recording medium as a basic unit, and recorded in the first recording medium 16 via the first loader 14.

As the number of the clips recorded in the first recording medium 16 becomes too large to be stored in one recording medium, the clips are recorded in the subsequent recording media, and successively recorded in the recording media, up to the nth recording medium 17 via the nth loader 15.

The first and nth recording media 16 and 17 are arbitrary recording media that is loaded to be freely attachable or removable in the imaging device. Examples of the recording media include a hard disk drive of PC card type, a card-shape recording medium such as a memory card, and a memory card package in which a plurality of memory cards are installed in order to increase a capacity and a processing speed, and the like. In the case where the memory card package is used as the recording media, the number of the clusters equal to the number of the memory cards embedded in the memory card package serves as a basic unit for the recording/reproduction in the recording/reproduction controller 13.

In the present preferred embodiment, the first recording medium 16 is used as a recording medium for the image data obtained by the imaging device 200 and also used as a transporting medium for transporting the recording support information from the program constitution input device 100 to the imaging device 200. The recording support information are transported from the program constitution input device 100 to the imaging device 200 via the first recording medium 16, and may be wirelessly transmitted from the program constitution input device to the imaging device 200. Thus, the recording support information may be unlimitedly transmitted in any manner. In the case of the wireless transmission, the imaging device 200 comprises a radio receiver, and the radio receiver and the first information acquiring unit 7A constitute the input unit.

The file-managing unit 9 manages the files according to a file system such as FAT 32. The file management information used for the management includes a medium ID for recoding medium capable of identifying each of freely attachable or removable recording medium, a file ID for video file capable of identifying each image file, a file ID for audio file capable of identifying each of audio file, a frame ID capable of identifying a particular frame in each file, a file capacity of each file, and the like. In the imaging device 200 according to the present preferred embodiment, the recording support information and the imaging status information in addition to the foregoing management information, are used as the file management information.

The video file generator 10 and the audio file generator 11 generate the files according to a file format such as MXF (Material Exchange Format) that is a material-exchange file format, AVI (Audio Video Interleaving) or WAV. The index file generator 12 generates the files according to a text file format such as XML (Extensible Markup Language) or a file format such as CSV (Comma Separated Value).

Below is described a specific example of a method for generating the various information (filming) of the imaging status information.

The recording time information (filming) is generated as follows. In the imaging operation, an imaging date and time information is added to the imaging data. The imaging date and time information is read from an embedded timer (provided with a calendar function) 30 in the imaging device 200 by the video file generator 10 and the audio file generator 11 and added to the imaging data. At the time (when the image is obtained), the schedule information acquiring section 7a reads the imaging date and time information from the embedded timer 30 in synchronization with the imaging operation and supplies the read information to the file-managing unit 9. The date information acquiring section 7a may acquire the imaging date and time information from the GPS positioning apparatus 7f in synchronization with the imaging operation.

The recorded performer information (filming) is generated as follows. As described earlier, the performer α carries with him/her the radio transmitter 7d during the imaging operation. The radio transmitter 7d transmits the radio signal to which the performer identifying information (performer ID number) individually set for the performer α is added. The radio signal transmitted from the radio transmitter 7d is received by the radio receiver 7e. The performer information acquiring section 7b analyzes the radio signal and extracts the performer identifying information (performer ID number). In the case where at least two performers appear in one imaging operation, the respective performers are discriminated, and the relevant performer identifying information (performer ID number) is individually extracted.

The performer information acquiring section 7b supplies the extracted performer identifying information (performer ID number) to the file-managing unit 9. The file-managing unit 9 records each performer identifying information (performer ID number) in such a manner that it is associated with the imaging (clip).

The recording site information (filming) is generated as follows. As described earlier, the GPS positioning apparatus 7f executes the positioning operation in the imaging operation. The site information acquiring section 7c generates the recording site information (filming) based on a result of the positioning by the GPS positioning apparatus 7f and supplies the generated information to the file-managing unit 9.

As described referring to FIG. 3, the plurality of scenes constitute one video program, and the respective scenes are joined with each other according to the order based on the scenario. As a result, the one video program is completed.

Figure 8:
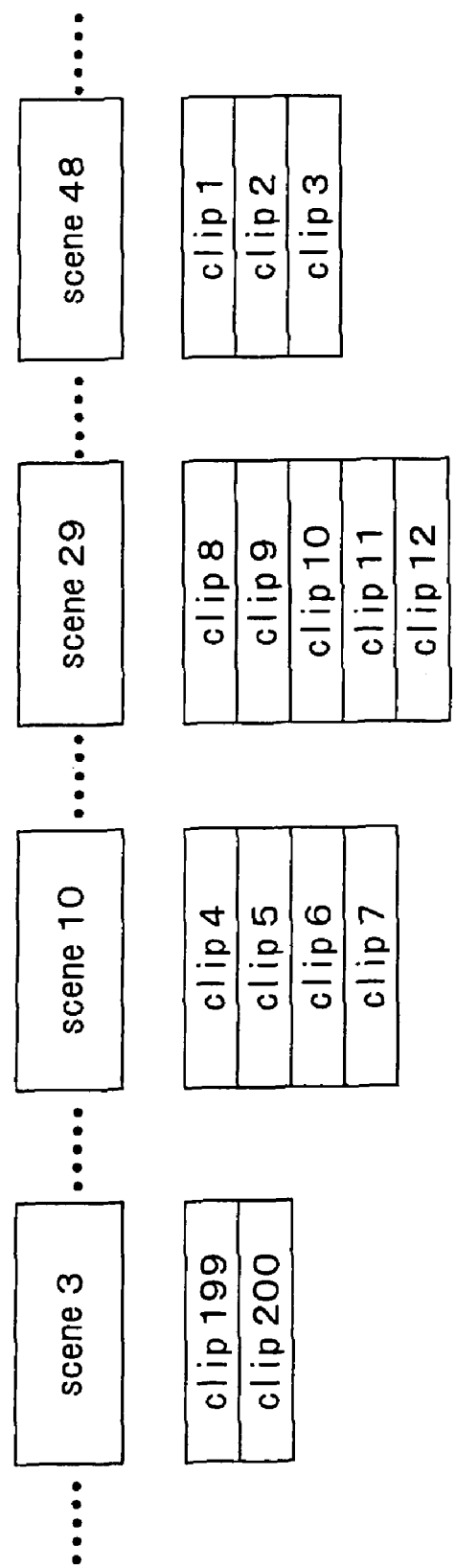
FIG. 8 shows a relationship between scenes and the clips constituting the respective scenes according to the present invention.

FIG. 7 shows a correlation between the imaging status information collected from the file-managing unit 9 and the recorded clips. FIG. 8 shows a correlation between the scenes and the clips, wherein the classification result by the file-managing unit 9 is shown. These drawings to show the correlations are prepared by the file-managing unit 9 which is supplied with the recording support information and the imaging status information and recorded in a classification table (not shown) of the file-managing unit.

As shown in FIG. 7, the recording date information (filming), recorded performer information (filming) and recording site information (filming) are associated with the respective recorded clips. The file-managing unit 9, based on these imaging status information generated during the imaging operation, judges which scene the recorded clip constitutes through collation of the imaging status information and the recording support information, and automatically classifies the clips into the respective scenes based on a result of the judgment.

More specifically, as shown in FIG. 4, because the recording start time and the recording ending time of each scene is set by the recording date information (schedule), the recording date information (filming) of each clip obtained during the recording operation is collated with the recording date and time information (schedule) and the program constitution information, and thereby it is judged which scene the recorded clip belongs to. In a similar manner, as shown in FIG. 5, because the performer appearing in each scene is set by the recorded performer information (schedule), the recorded performer information (filming) obtained during the recording operation is collated with the recorded performer information (schedule) and the program constitution information, and thereby it is judged which scene the recorded clip belongs to. In a similar manner, as shown in FIG. 6, because the recording site of each scene is set by the recording site information (schedule), the recording site information (filming) obtained during the recording operation is collated with the recording site information (schedule) and the program constitution information, and thereby it is judged which scene the recorded clip belongs to.

Hereinafter, an example of a method for classifying the clips is described referring to FIGS. 7 and 8. The description is given referring to the scenes 48, 10 and 3.

As shown in FIGS. 4-6, it is assumed that the recording date information (schedule) of the scene 48 is [S1≦recording date and time (schedule)<E1], the recorded performer information (schedule) is [performer A, performer B, and performer C], and the recording site information (schedule) is [site 1]. Further, it is assumed that the recording date information (filming) of the clips 1, 2 and 3 is [S1≦(T1-T3)<E1], the recorded performer information (filming) is [performer A, performer B, and performer C], and the recording site information (filming) is [site 1].

In case of the foregoing assumptions, the file-managing unit 9 makes the following judgments.

The recording date information (filming) of the clips 1, 2 and 3 satisfies the recording date information (schedule) of the scene 48. [S1≦(T1-T3)<E1]

The recorded performer information (filming) of the clips 1, 2 and 3 satisfies the recorded performer information (schedule) of the scene 48. [performer A, performer B, and performer C]=[performer A, performer B, and performer C]

The recording site information (filming) of the clips 1, 2 and 3 satisfies the recording site information (schedule) of the scene 48. [site 1]=[site 1]

The file-managing unit 9, which made such judgments, classifies the clips 1, 2 and 3 into the scene 48 based on the collation with the program constitution information as shown in FIG. 8.

As shown in FIGS. 4-6, it is assumed that that the recording date information (schedule) of the scene 10 is [S2≦recording date (schedule)<E2], the recorded performer information (schedule) is [performer A, performer B, and performer D, performer F, and performer G], and the recording site information (schedule) is [site 2]. Further, it is assumed that the recording date information (filming) of the clips 4-7 is [S2≦(T4-T7)<E2], the recorded performer information (filming) is [performer A, performer B, and performer D, performer F, and performer G], and the recording site information (filming) is [site 2].

In case of the foregoing assumptions, the file-managing unit 9 makes the following judgments.

The recording date information (filming) of the clips 4-7 satisfies the recording date information (schedule) of the scene 10. [S2≦(T4-T7)<E2]

The recorded performer information (filming) of the clips 4-7 satisfies the recorded performer information (schedule) of the scene 10. [performer A, performer B, and performer D, performer F, and performer G]=[performer A, performer B, and performer D, performer F, and performer G]

The recording site information (filming) of the clips 4-7 satisfies the recording site information (schedule) of the scene 10. [site 2]=[site 2]

The file-managing unit 9, which made the foregoing judgments, classifies the clips 4-7 into the scene 10 based on the collation with the program constitution information as shown in FIG. 8.

As shown in FIGS. 4-6, it is assumed that that the recording date information (schedule) of the scene 3 is [T50≦recording date (schedule)<E50], the recorded performer information (schedule) is [performer H, performer J, and performer K, and performer L], and the recording site information (schedule) is [site 50]. Further, it is assumed that the recording date information (filming) of the clips 199 and 200 is [S50≦(T199, T200)<E50], the recorded performer information (filming) is [performer H, performer J, and performer K, and performer L], and the recording site information (filming) is [site 50].

In case of the foregoing assumptions, the file-managing unit 9 makes the following judgments.

The recording date information (filming) of the clips 199 and 200 satisfies the recording date information (schedule) of the scene 3. [S50≦(T199, T200)<E50]

The recorded performer information (filming) of the clips 199 and 200 satisfies the recorded performer information (schedule) of the scene 3. [performer H, performer J, and performer K, and performer L]=[performer H, performer J, and performer K, and performer L]

The recording site information (filming) of the clips 199 and 200 satisfies the recording site information (schedule) of the scene 3. [site 50]=[site 50]

The file-managing unit 9, which made the foregoing judgments, classifies the clips 199 and 200 into the scene 3 based on the collation with the program constitution information as shown in FIG. 8.

Figure 9:
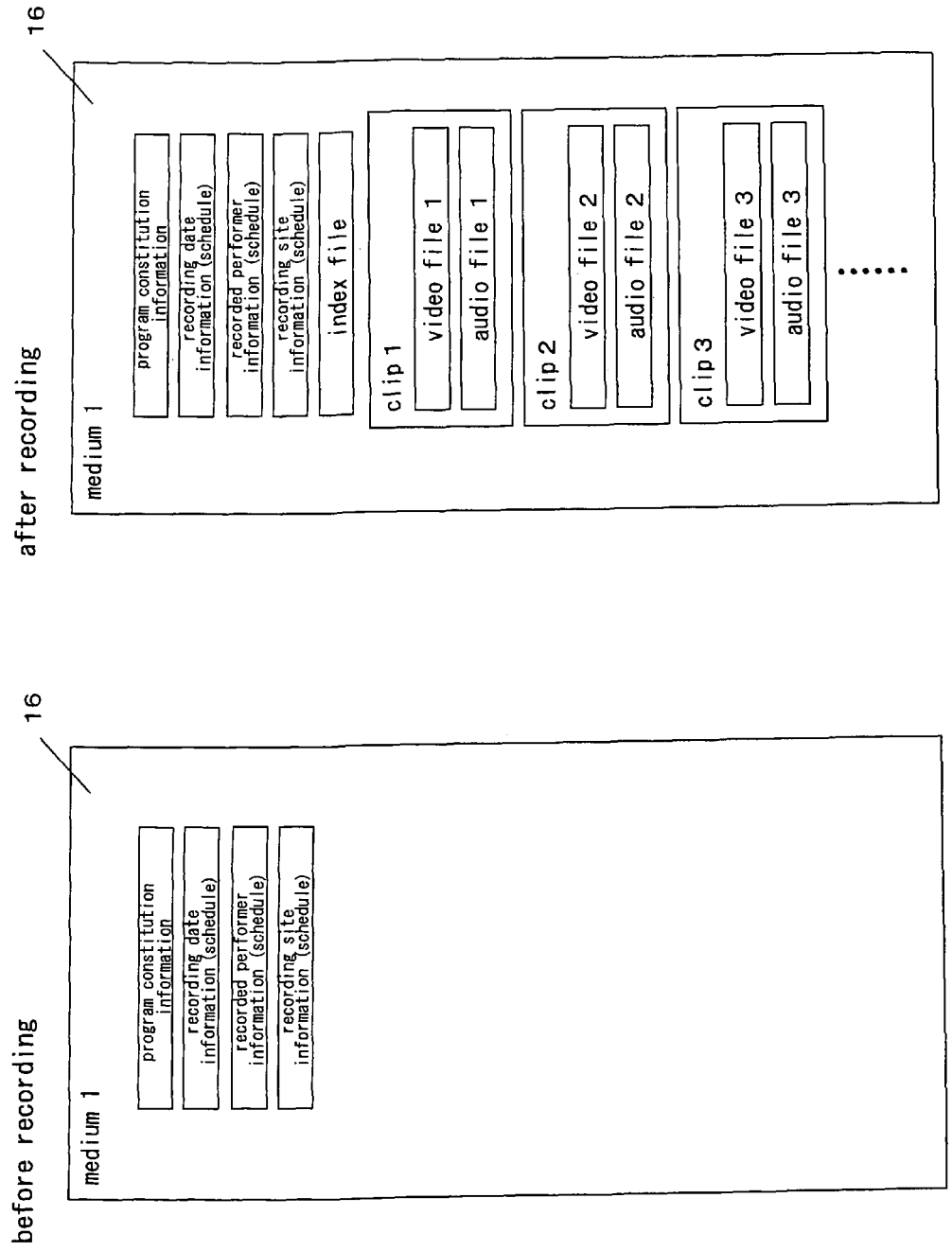
FIG. 9 shows a comparison of recorded contents in a recording medium before and after the recording operation.

FIG. 9 shows a comparison of recorded contents of the recording medium before and after the recording. As shown in FIG. 9, a medium 1 is provided in the first recording medium 16 as the medium ID. The medium ID is an ID number for discriminating the recording media. The program constitution information, recording date information (schedule), recorded performer information (schedule) and recording site information (schedule) constituting the recording support information are recorded in the recording medium 16 like this prior to the start of the recording operation. These information are recorded by the program constitution input device 100. The first recording medium 16 in which the information are recorded is loaded in the imaging device 200 according to the present preferred embodiment. Accordingly, the recording support information are read from the first recording medium 16 and stored in the file-managing unit 9. In the current state, the image is recorded as follows.

When the recording operation starts, the recording date information (filming), recorded performer information (filming) and recording site information (filming) constituting the imaging status information, together with the recorded video files and the audio files, are recorded in a blank space of the first recording medium 16. The imaging status information is recorded in the first recording medium 16 in association with the video files and the audio files.

After the recording, as shown in FIG. 9, the video files and the audio files are collectively recorded in the first recording medium 16 as the clips, and further collectively recorded for each scene, so that the index file in which a clip information linked with the program constitution is written is recorded. The index file is prepared as follows.

In the recording operation, the second information acquiring unit 7B generates the imaging status information at the same time and supplies the generated information to the file-managing unit 9. The file-managing unit 9 collates these imaging status information with the recording support information in the first recording medium 16 to thereby generate the index file for associating the clips being imaged and the program constitution. The file-managing unit 9 records the generated index file in the recording medium currently used (first recording medium 16 in the present preferred embodiment).

Figure 10:
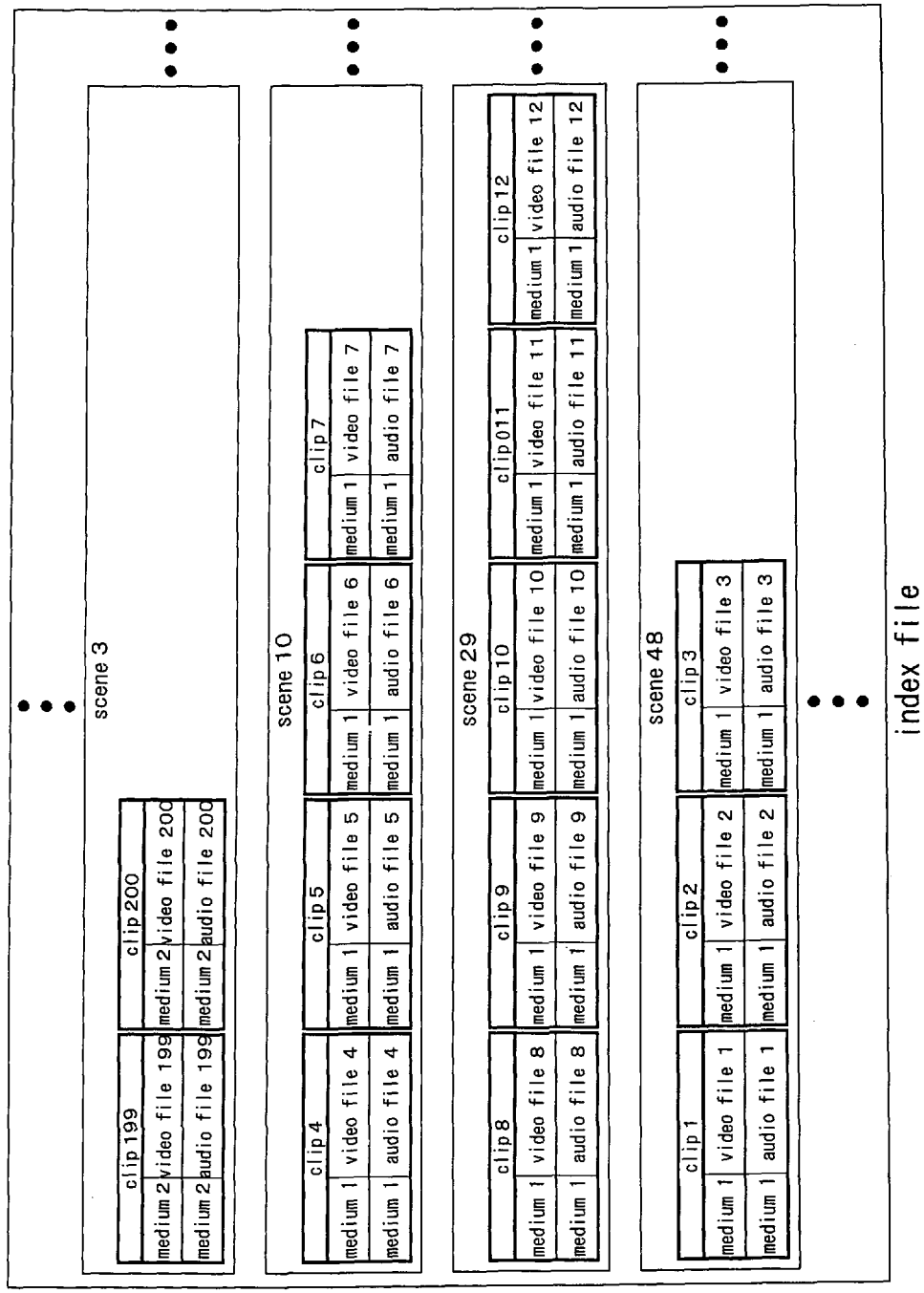
FIG. 10 is a schematic diagram of an example of index file contents according to the present invention.

Next, an editing operation in an external editing device, such as a personal computer, is described referring to FIGS. 9-11. FIG. 10 is a schematic diagram to show one example of the contents of the index file. FIG. 11 shows an example of an editing list.

As shown in FIG. 9, the respective files, which are the video files, audio files and index files, are recorded in the first recording medium 16 after the recording operation is completed, and the respective files are managed in each recording medium according to a predetermined file system.

As shown in FIG. 10, the media IDs of the recording media such as the medium 1 and medium 2, and the file IDs of the respective files such as the video files 1, 2, 3, . . . , and the audio files 1, 2, 3, . . . , are classified for each clip based on the clip IDs such as the clips 1, 2, 3, . . . , recording support information and imaging status information. The classified media IDs are collectively recorded for each scene together with the scene IDs such as the scenes 1, 2, 3 . . . .

In the editing device, first, the first recording medium 16 is inserted, and the index file is read, so that the video files and the audio files of the respective clips, which can be confirmed as the image and sound, can be identified. An editor views the images and listens to the sounds reproduced from the video files and the audio files for each scene, judges OK or NG for whether or not each clip is necessary, and prepares the editing list as shown in FIG. 11 which complies with a desired story. The prepared editing list is recorded in the first recording medium 16 according to a predetermined file format such as a text file (not shown). When the main editing operation is completed, reproduction is carried out based on the editing list at reproducing.

In the reproduction, the necessary clips are reproduced from the first recording medium 16 through the nth recording medium 17 in accordance with the order of the program constitution. The respective clips decode and reproduce each of the video files and the audio files of the respective clips that are described in the index file and are collectively managed.

As described above, according to the present preferred embodiment, the recorded clips are respectively classified for each of the scenes constituting the video program and collectively managed based on the previously recorded recording support information. Because the clips are already roughly edited at the same time as the completion of the recording operation, the main editing operation simply selects the desired clips that are collected per scene and is then terminated. Therefore, a labor hour of the main editing operation can be largely reduced.

Further, such a human error as omission of any scene to be recorded can be prevented from happening because the recording contents and the recording schedule can be confirmed during the recording operation. Therefore, an entire workflow, such as the recording, editing and completion of the program, can be more efficiently improved.

In the present preferred embodiment 1 described so far, the three of the schedule, performer and site information are used as the recording support information and the imaging status information in order to more accurately classify the clips. Therefore, it is needless to say that one or two of the three of the schedule, performer and site information may be arbitrarily selected as the recording support information and the imaging status information. Further, it goes without saying that at least the three information may be used as the recording support information and the imaging status information.

Figure 12:
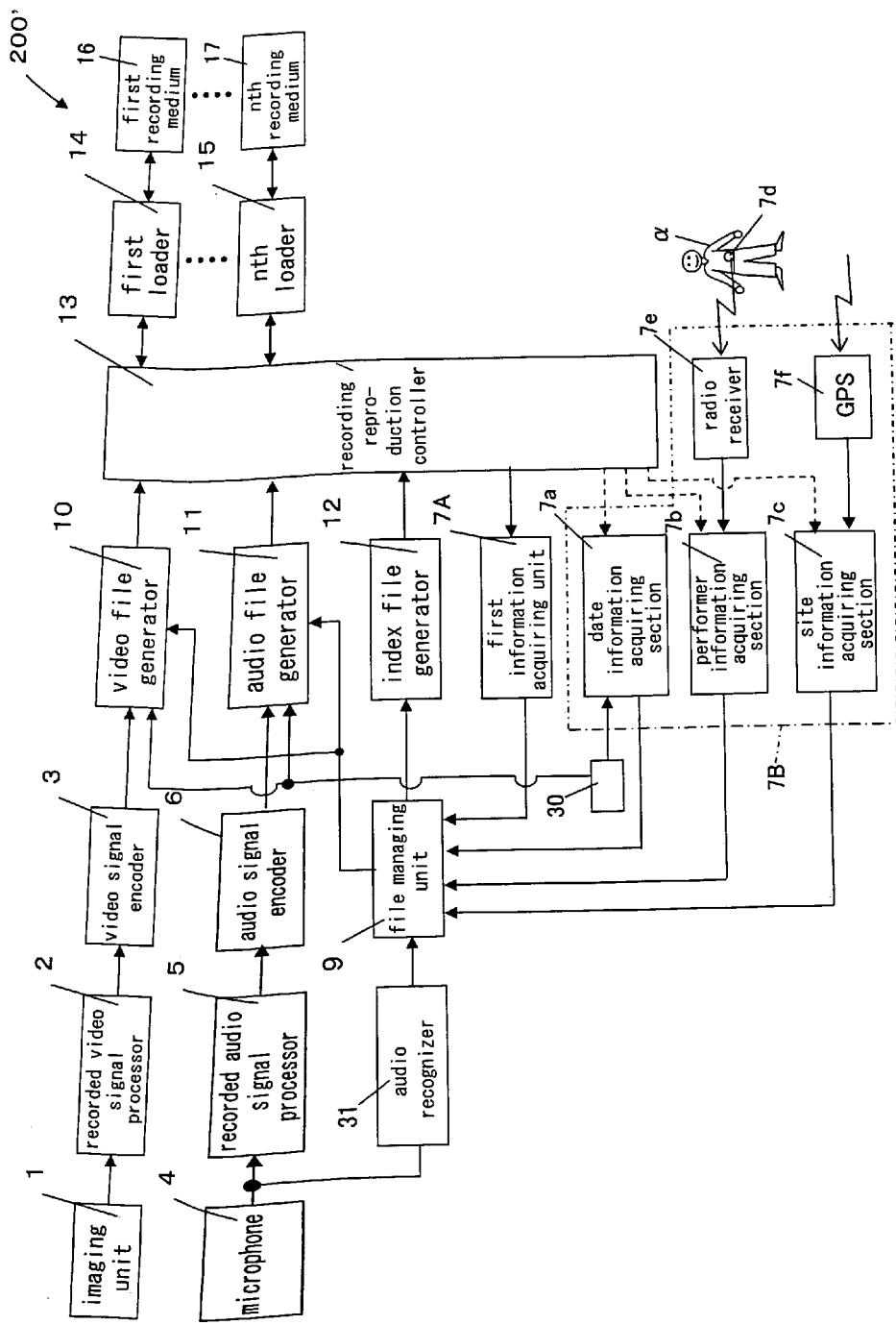
FIG. 12 is a block diagram of an imaging device according to a first modified embodiment of the preferred embodiment 1.

Further, a speech spoken by the performer may be used in each clip as the recording support information and the imaging status information. In such a case, an audio recognizer 31 for recognizing the audio signal inputted to the microphone 4 as the sound is further provided in an imaging device 200' as shown in FIG. 12, and the following operation is executed.

A speech information of each scene is inputted to the program constitution input device 100 and recorded in the first recording medium 16, and then, fetched into the imaging device 200' via the first recording medium 16. The speech information of each scene mentioned here are a speech by which the relevant scene can be identified referring to a script, and, for example, a speech indicating the site, time and status capable of alternatively specifying the relevant scene. The speech information is selected from the script by the planner of the video program and inputted to the program constitution input device 100. The speech information of each scene fetched into the imaging device 200' via the first recording medium 16 is extracted by the first information acquiring unit 7A and memorized in the file-managing unit 9. In the present preferred embodiment, the speech information is used as imaging support information.

After the foregoing preparatory processing is executed, each clip is imaged (recorded). The audio information (speech information of the performer) recorded by the microphone 4 in the imaging operation is subjected to audio recognition and converted into a text data (speech) by the audio recognizer 30. Then, the text data (speech) is outputted to the file-managing unit 9. The file-managing unit 9 collates the supplied text data (speech) with the speech information (script) of each scene memorized in advance to thereby classify the recorded clips. In the foregoing processing, the speech information is used as the imaging support information, and the text data (speech) is used as the imaging status information. The microphone 4 and the audio recognizer 30 constitute the imaging status acquisition unit. The microphone 4 may be integrally incorporated in the imaging device 200' or may be provided separately from the imaging device 200' being connected by fixed-line or wirelessly to the imaging device 200'.

Figure 13:
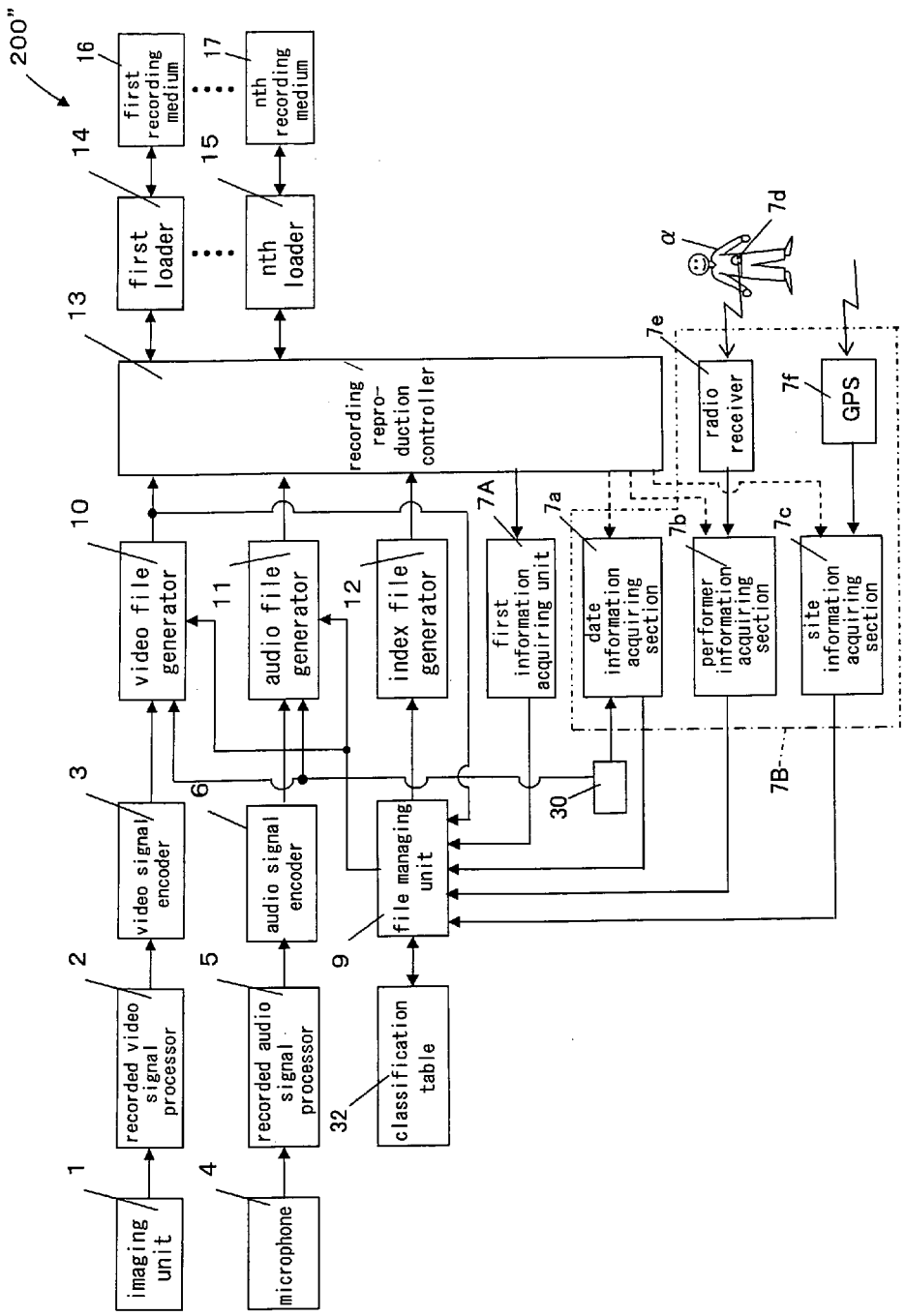
FIG. 13 is a block diagram of an imaging device according to a second modified embodiment of the preferred embodiment 1.

Further, a background image in each clip may be used as the recording support information and the imaging status information, in that case an imaging device 200" further comprises a classification table 32 as shown in FIG. 13, and a background image information (schedule) of each scene is stored in the classification table 32.

The background image information (schedule) of each scene is imaged by an arbitrary imaging device when the imaging site of each scene is previously checked by the planner of the video program and inputted to the program constitution input device 100. The background image information (schedule) of each scene inputted to the program constitution input device 100 is recorded in the first recording medium 16 and then fetched into the imaging device 200" via the first recording medium 16. The background image information (schedule) of each scene fetched into the imaging device 200" via the first recording medium 16 is extracted by the first information acquiring unit 7A and thereafter memorized in the classification table 32 via the file-managing unit 9. The classification table 32 memorizes the background image information (schedule) in association with each scene.

After the foregoing preparatory processing is executed, each clip is imaged (recorded). The video information obtained in the imaging operation is outputted from the video file generator 10 to the file-managing unit 9. The file-managing unit 9 video-collates the supplied video data with the background image information (schedule) of each scene previously memorized in the classification table 32 to thereby classify the recorded clips.

In the foregoing processing, the background image information (schedule) is used as the imaging support information, and the video information actually obtained in the imaging operation is used as the imaging status information. The image pickup unit 1, recorded video-signal processor 2 and video file generator 10 constitute the imaging status acquisition unit.

Further, when the audio recognizer 31 shown in FIG. 12 is used, the clips can be classified in more detail, which is described below.

An imaging administrator (imaging director) roughly judges a quality level of the imaged clip in a video recording site immediately after the recoding operation. He made the rough judgment based on a level of a performance by the performer. Therefore, the recorded clips are roughly classified into candidate clips which are possibly the components (scenes) of the video program and non-candidate clips failing to be the candidate clips in the imaging administrator's (imaging director's) concept for the recording operation after the imaging operation is completed.

Based on the steps of the imaging operation, it is roughly judged immediately after the clip is imaged that any clip for which the imaging administrator (imaging director) loudly utters "OK" is the candidate clip which is possibly the component (scene) of the video program as a general interpretation in the imaging site. Based on the foregoing description, the file-managing unit 9 classifies the clips into the candidate clips that are possibly the components (scenes) of the video program and the non-candidate clips failing to be the candidate clips as follows.

The audio recognizer 31 converts the audio information recorded by the microphone 4 into a text data through constant audio recognition treatment and supplies the text data to the file-managing unit 9. It is judged by the file-managing unit 9 whether or not the voice pronounced "OK" by the imaging administrator (imaging director) is present in the audio recognition result (text data) supplied by the audio recognizer 31. Then, the file-managing unit 9 classifies any clip including the "OK" voice as the candidate clip which is possibly the component (scene) of the video program, while classifying any clip not including the "OK" voice as the non-candidate clip failing to be the component (scene) of the video program. The "OK" voice of the imaging administrator (imaging director) is uttered immediately after the clip is obtained. Therefore, the file-managing unit 9 judges the presence of the "OK" voice at an ending position in the imaged clip to thereby prevent a wrong judgment (the "OK" voice present in the speech was misheard, and the like) and increase an accuracy in making the judgment.

Figure 14:
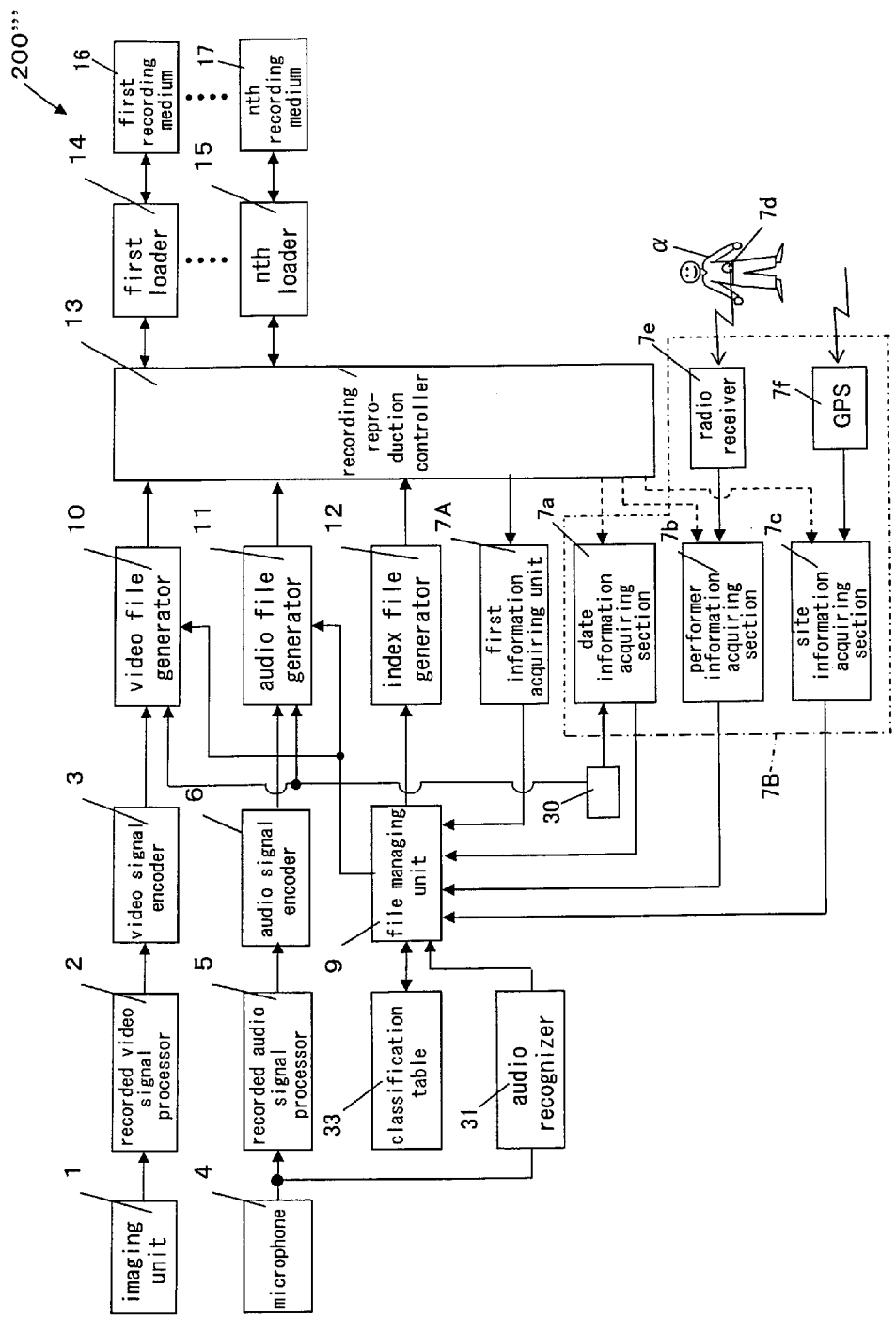
FIG. 14 is a block diagram of an imaging device according to a third modified embodiment of the preferred embodiment 1.

In the foregoing description, whether or not the clip can be the candidate clip which is the possibly the component (scene) of the video program is judged by the presence or absence of the "OK" vice of the imaging administrator (imaging director), however, may be judge as follows referring to FIG. 14. Whether or not the clip can be the candidate clip which is possibly the component (scene) of the video program can be judged by, other than the "OK" voice of the imaging administrator (imaging director), a plurality of voices which can be sounded by the imaging administrator (imaging director) indicating that the clip is judged to show favorable contents. The plurality of voices indicating the favorable contents include "superb", "well done", "good", "so-so" and the like, and further include many different terms depending on the imaging administrator's (imaging director's) favorite phrases. Therefore, an imaging device 200''' shown in FIG. 14 further comprises a classification table 33. An imaging operator of the imaging device 200''' checks in advance words possibly sounded by the imaging administrator (imaging director) in charge of the imaging operation when the favorable clip is obtained and registers the words in the classification table 33. Then, the file-managing unit 9 collates the audio recognition result (text data) supplied from the audio recognizer 31 with the words registered in the classification table 33 (words sounded by the imaging administrator (imaging director) when he/she finds the clip favorable) when the clips are imaged to thereby judge whether or not the imaging administrator (imaging director) spoke of any of the registered words for the favorable imaging result. The file-managing unit 9 classifies any clip in which any of the voices for the favorable imaging result is present as the candidate clip which is possibly the component (scene) of the video program, while classifying any clip in which the any of the voices for the favorable imaging result is absent as the non-candidate clip failing to be the component of the video program.

In the foregoing evaluating process, the microphone 4 and the audio recognizer 31 constitute an evaluation input unit. Further, the result of recognizing the voice (text data) vocalized for the favorable imaging result constitutes a recording status evaluation.

Not only the microphone 4 for the imaging operation connected to the imaging device 200, but also a mobile microphone connected by fixed-line or wirelessly to the imaging device 200 and carried by the imaging administrator (imaging director) can constitute the microphone of the evaluation input unit.

In the foregoing description, the imaging administrator's (imaging director's) voice collected by the microphone 4 or the mobile microphone is converted into the text data by the audio recognizer 31 and collated with the words in the classification table 33, so that the relevant clip is evaluated (classified). However, the collected voice of the imaging administrator (imaging director) may not be necessarily converted into the text data but can be directly evaluated as the voice itself. In such a case, the audio data itself sounded by the imaging administrator (imaging director) when the imaging result is favorable is stored in the classification table 33. The file-managing unit 9 collates the collected voice of the imaging administrator (imaging director) with the audio data stored in the classification table 33 by the respective audio data to thereby evaluate (classify) the clip. In the collation, for example, vocal prints can be compared.

The evaluation input by the imaging administrator (imaging director) is not limited to the voice input. The imaging administrator (imaging director) may obtain the clips while carrying the evaluation input unit (not shown) connected by fixed-line or wirelessly to the imaging device 200 and operates buttons of the evaluation input unit for the evaluation input immediately after the imaging operation. In such a case, the evaluation information (recording status evaluation) inputted to the evaluation input unit is supplied to the file-managing unit 9 of the imaging device 200 via the wired or wireless communication.

Preferred Embodiment 2

Figure 15:
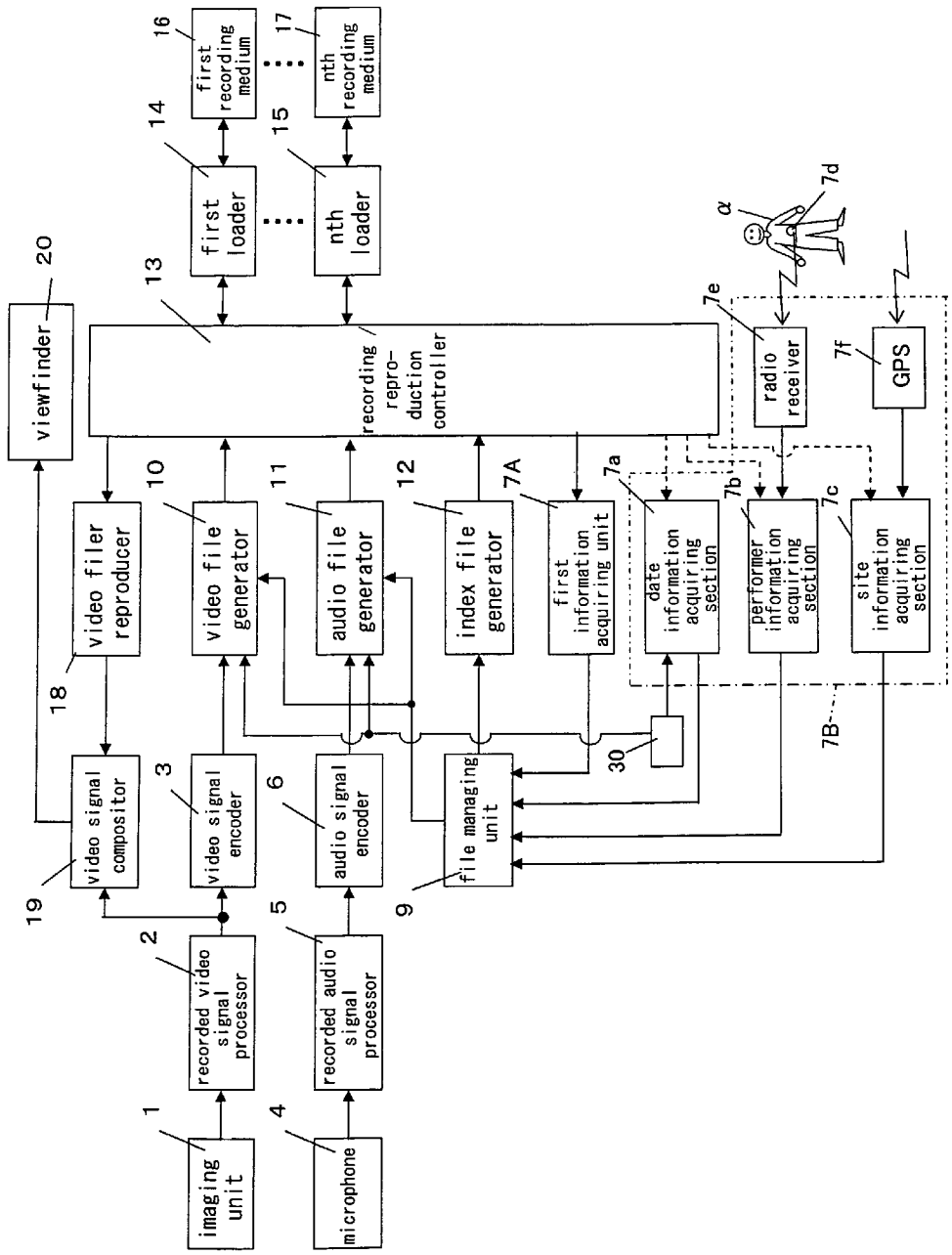
FIG. 15 is a block diagram of an imaging device according to a preferred embodiment 2 of the present invention.

FIG. 15 is a block diagram of an imaging device according to a preferred embodiment 2 of the present invention.

The imaging device according to the present preferred embodiment 2 further comprises a video file reproducer 18, a video signal compositor 19, and a viewfinder 20 as a display unit in the constitution according to the present preferred embodiment 1 shown in FIG. 2.

Below is described an operation of recording the obtained video signal in the recording medium while displaying the obtained image and the previously recorded image on the viewfinder 20 in an image combine manner using the imaging device according to the present invention.

The video file previously recorded in any of the first recording medium 16 through the nth recording medium 17 is read by the recording/reproduction controller 13. The read video file is reproduced with the video file reproducer 18. The video signal compositor 19 combines the video signal reproduced by the video file reproducer 18 and the video signal that is obtained by the image pickup unit 1 and signal-processed by the recorded video signal processor 2. The composite video signal is displayed on the viewfinder 20. On one hand, the video signal outputted from the recorded video signal processor 2 is encoded with the video signal encoder 3, apart from the signal combined by the video signal compositor 19. The audio signal is outputted from the microphone 4. The audio signal outputted from the microphone by the recorded audio signal processor 5 is signal-processed and encoded by the audio signal encoder 6. The encoded video signal and the encoded audio signal are recorded in the recording medium by the video file generator 10 and the audio file generator 11 according to a predetermined file format. The video file recorded at the time is recorded separately from the video file previously recorded.

Figure 16:
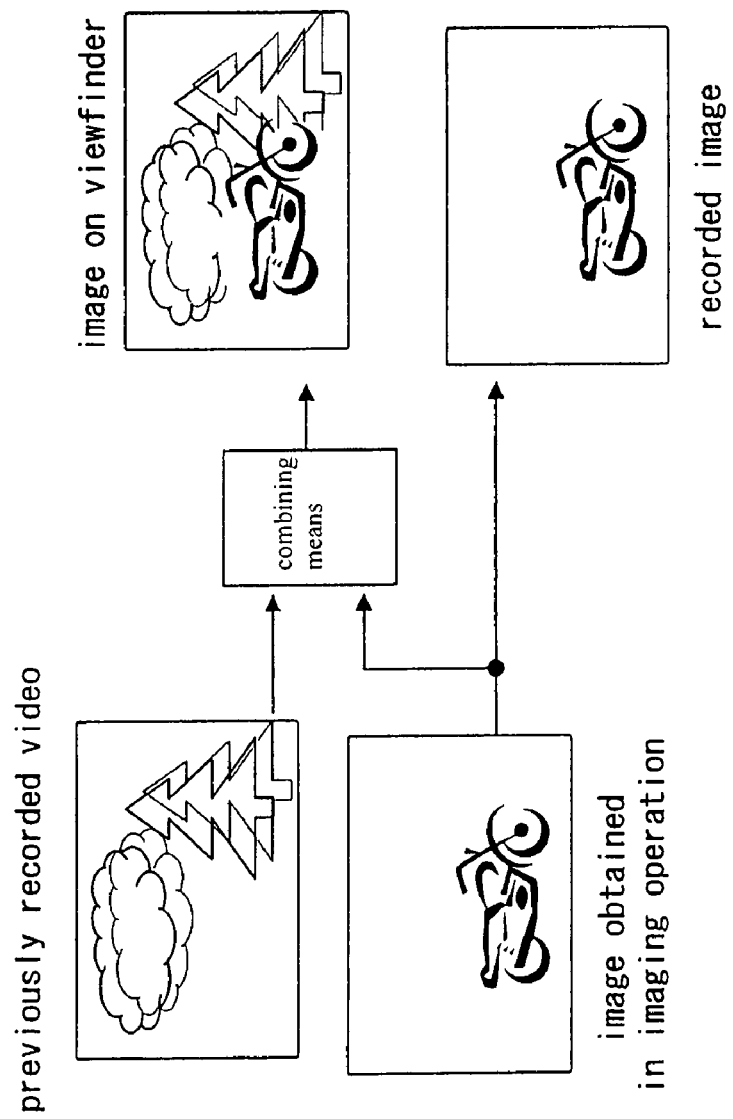
FIG. 16 is a explanation diagram of an operation according to the preferred embodiment 2.

The foregoing operation is described referring to FIG. 16.

A video used for chroma key combining is previously recorded in the recording medium, and the video signal previously recorded is reproduced. An image to be combined is filmed at the same time as the reproduction. The previously recorded video signal and the video signal filmed by the imaging operation are combined and displayed on the viewfinder 20. The video signal resulting from the imaging operation is encoded separately from the previously recorded video signal and becomes a video file. The video signal resulting from the imaging operation is recorded in the recording medium while the previously recorded video signal is being read from the recording medium.

As described above, according to the present preferred embodiment, when the image is filmed as a purpose for the processing such as the chroma key composition, the imaging operation is executed while the image to be previously recorded in the recording medium and used for combination and the image obtained in the imaging operation are combined and treated in the imaging device, and the combined image is being displayed on the display unit such as the viewfinder 20 and confirmed. Thereby, the image obtained in the imaging operation can be evaluated in the final form of the combined image in the recording stage. Therefore, an optimal image can be speedily and reliably selected in comparison to such a manner that the recording medium is brought back from the recording site so that the filmed image is actually edited and processed, and then evaluated. Further, a degree of freedom in the editing work implemented after the imaging operation is increased because the obtained video signal recorded in the recording medium and the previously recorded video signal are stored in the different files, and the video signal recorded in the recording medium is the video signal itself obtained from the imaging operation before the combining process is carried out.

When the video signal is encoded as described in the present preferred embodiment, the DV Standard or MPEG2 Standard can be adopted to increase the efficiency of the encoding operation. However, any standard for the encoding operation may be adopted, such as MPEG4, JPEG2000, Motion JPEG 2000, and the like.

The loader may be provided with a plurality of different card slots so that card-shape recording media of different types can be loaded in attachable or removable state. For example, the methods are thought that a bit stream of a high bit rate for obtaining a high-resolution reproduced image may be recorded in a memory card package having a large capacity and a high transfer speed with a shape of PC card TYPE 1, TYPE2 or TYPE 3, while a bit stream of a low bit rate for obtaining a low-resolution reproduced image may be recorded in a memory card such as a SD memory card having a size of a postage stamp and a relatively small capacity.

Further, in the respective preferred embodiments described above, the recording support information are previously recorded in the first recording medium installed in the first loader, however, it is not necessary to collectively record the recording support information only in a recording medium installed in any particular loader. For example, a plurality of recording support files may be separately recorded in a plurality of recording media.

Further, the recording medium may be constructed to be attachable or removable to a plurality of loaders provided in a general-purpose bus such as a PCI bus.

INDUSTRIAL APPLICABILITY

An imaging device according to the present invention can be effectively used as an image device capable of recording a video/audio information and loading a plurality of attachable or removable recording media, or the like, in which a metadata is used in recording materials so that the materials can be efficiently and optimally recorded in a workflow of program production, and a production time and a production cost can be reduced through an efficiently improved entire program production process.

What is claimed is:

1. An imaging device comprising:
   an imaging unit for recording a video/audio information;
   an input unit to which a recording support information of the video/audio information is inputted; and
   a managing unit for classifying the video/audio information based on the recording support information, wherein
   the imaging unit retains the recording support information inputted to the input unit, and then records the video/audio information, and
   the managing unit collates an imaging status information indicating a status of the video/audio information in an imaging operation obtained when the video/audio information is imaged with the recording support information to thereby classify the recorded video/audio information.

2. The imaging device according to claim 1, wherein
   the recording support information is an information relating to a constitution of a video program produced based on the video/audio information as materials, and
   the managing unit collates the information relating to the constitution of the video program with the imaging status information to thereby classify the video/audio information.

3. The imaging device according to claim 2, wherein
   a plurality of scenes constitute the video program and the recording support information is set for each scene, and
   the managing unit collates the information relating to the constitution of the video program with the imaging status information to thereby classify the video/audio information with respect to each scene.

4. The imaging device according to claim 1, further comprising an imaging status acquisition unit for acquiring the imaging status information when the video/audio information is imaged by the imaging unit, wherein
   the managing unit collates the recording support information with the imaging status information to thereby classify the video/audio information.

5. The imaging device according to claim 4, wherein
   the recording support information is an information relating to a time schedule for recording the video/audio information, and
   the imaging status information is an information relating to a recording date when the video/audio information is actually filmed.

6. The imaging device according to claim 4, wherein
   the recording support information is an information relating to a site scheduled to record the video/audio information, and
   the imaging status information is an information relating to a site where the video/audio information is actually recorded.

7. The imaging device according to claim 4, wherein
   the recording support information is an information relating to a performer scheduled to appear in a video program produced based on the video/audio information as materials, and
   the imaging status information is an information relating to a performer who appear in the actually filmed video/audio information.

8. The imaging device according to claim 4, wherein
   the recording support information is an information relating to a speech scheduled to be spoken by a performer who appear in the video program produced based on the video/audio information as materials, and
   the imaging status information is an information relating to a speech spoken by performer who actually appear in the obtained video/audio information during his/her performance.

9. The imaging device according to claim 4, wherein
   the recording support information is an information relating to a background video information of a scheduled recording site where the video/audio information is filmed, and
   the imaging status information is an information relating to a background video information of a recording site where the video/audio information is actually filmed.

10. The imaging device according to claim 1, further comprising:
    an index information generator for generating an index information for collectively managing the video/audio information based on a classification result by the managing unit; and
    a recorder for recording the video/audio information and the index information in an attachable or removable recording medium.

11. The imaging device according to claim 10, wherein
    the recording support information is written in the recording medium,
    the input unit reads the recording support information written in the recording medium, and
    the recorder uses the recording medium in which the recording support information is written as a recording medium for recording without distinguishing the recording medium from any other recording medium.

12. The imaging device according to claim 10, wherein
    the index information includes a video information ID and an audio information ID capable of identifying the video/audio information, and a recording medium ID capable of identifying each recording medium.

13. The imaging device according to claim 10, wherein
    the recording medium complies with PC card standards.

14. The imaging device according to claim 10, wherein
    the recorder can record in PC cards of different types in compliance with PC card standards and memory cards in compliance with memory card standards.

15. The imaging device according to claim 1, further comprising an evaluation input unit for receiving an input relating to an recording status evaluation for the video/audio information made by an imaging operator, wherein
    the managing unit further classifies the recorded video/audio information based on the recording status evaluation inputted to the evaluation input unit.

16. The imaging device according to claim 15, wherein the evaluation input unit receives an audio input from the imaging operator and converts the audio input into the recording status evaluation consisting of a text data through audio recognition.

17. The imaging device according to claim 16, further comprising a classification table for classifying the recoding status evaluation, wherein the managing unit collates the text data of the recording status evaluation supplied from the evaluation input unit with the classification table to thereby further classify the recorded video/audio information.

18. An imaging system comprising:

a program constitution input device for receiving the input of the recording support information from a preparer and recording the inputted recording support information in the recording medium; and the imaging device according to claim 11.

* * * * *